United States Patent [19]

Sfarti

[11] Patent Number: 4,901,251

[45] Date of Patent: Feb. 13, 1990

[54] APPARATUS AND METHODOLOGY FOR AUTOMATED FILLING OF COMPLEX POLYGONS

[75] Inventor: Adrian Sfarti, Sunnyvale, Calif.

[73] Assignee: Advanced Micro Devices, Inc., Sunnyvale, Calif.

[21] Appl. No.: 847,807

[22] Filed: Apr. 3, 1986

[51] Int. Cl.[4] .......................................... G06F 3/153
[52] U.S. Cl. .................... 364/521; 340/723; 340/798
[58] Field of Search ............... 364/518, 521; 340/703, 340/723, 747, 798, 799, 800; 382/44–48

[56] References Cited

U.S. PATENT DOCUMENTS

| | | | |
|---|---|---|---|
| 4,179,824 | 12/1979 | Marsh | 364/521 X |
| 4,213,252 | 7/1980 | Sullivan et al. | 364/521 X |
| 4,396,989 | 8/1983 | Fleming et al. | 364/521 |
| 4,475,104 | 10/1984 | Shen | 364/521 X |
| 4,609,993 | 9/1986 | Shimizu | 364/521 X |

Primary Examiner—Gary V. Harkcom
Assistant Examiner—H. R. Herndon
Attorney, Agent, or Firm—Gerald B. Rosenberg

[57] ABSTRACT

A graphics co-processor that is autonomously responsive to an instruction for the filling of a complex polygon, as defined by an enumeration of P vertices is described. The co-processor preferably includes a microengine sequencer and ALU (arithmetic logic unit) for selecting a first vertex from the enumeration of P vertices and for decomposing the complex polygon into a set of P-2 triangles, wherein each triangle includes the first vertex and to successive vertices as presented in the enumeration of P vertices is derived. A sense value is derived for each of the resultant P-2 triangles and each triangle is filled with a predetermined fill quantity that is qualified by the respectively associated sense value of the triangle being filled. Thus, the present invention provides for the autonomous execution of a fill polygon instruction for polygons having such complexities as concavities, self-intersections, overlapping sections and "holes".

24 Claims, 3 Drawing Sheets

APPARATUS AND METHODOLOGY FOR AUTOMATED FILLING OF COMPLEX POLYGONS

BACKGROUND OF THE INVENTION

1. Field of the Invention

The present invention generally relates to computer systems employing a dedicated graphics display processor and, in particular, to a robust apparatus and methodology eminently suited for implementation in a computer graphics co-processor for the non-ambiguous procedural filling of complex polygons in graphics display memory.

2. Description of the Related Art

In modestly to highly sophisticated computer systems, there is a desire to relieve the main computer or host processor of many time consuming, specialized and generally invariant processing tasks. For example, such tasks may include parallel/serial/parallel communication protocol conversions and the hardware control procedures required in the support of a physical hard disk drive. Consequently, various computer co-processors have been developed to support dedicated functions such as serial communications and mass storage control. As a result, the host is allowed to deal with such functions at a high level of abstraction.

The support of graphic display functions is another area of co-processor application. Conventionally, a dedicated graphics memory area is provided within the host computer system. At least a portion of this graphic display memory is mapped to a graphics display, typically a very high resolution CRT. The graphics display co-processor is typically implemented to accept high level commands, such as draw_line ($x_1y_1$, $x_2y_2$), draw_circle (xy, r) and draw_box ($x_1y_1$, $x_2y_2$, $x_3y_3$, $x_4y_4$). These high level instructions and the data provided with them, are processed by the graphics co-processor to convert x and y numerical values to a series of corresponding pixel locations and then to memory addresses of data storage locations within the graphic display memory. Often the graphics co-processor will further provide for the periodic reading of the graphic display memory to refresh the corresponding image presented on the CRT. Thus, even a simple high level instruction such as draw_line ($x_1y_1$, $x_2y_2$) can result in thousands of memory access operations on the graphics display memory, depending on the length of the line and the resolution of its representation within the graphics display memory.

Conventionally, a problem occurs in the handling of a high level instruction that directs the filling of a polygon. A fill instruction is one of the most complex high level instructions that could reasonably be supported by a graphics co-processor. The instruction, effectively accompanied by a list of the vertices of a specific polygon to be filled, initiates co-processor procedures that include selecting sets of three vertices from those of the polygon and then performing respective triangle area fills. The triangle fill is typically by an implementation of the Bresenham algorithm. This algorithm utilizes the calculable slope of two sides of the triangle, as known from its three vertices, as the basis for sequentially selecting the beginning and ending pixel locations of a fill line generally one pixel in width. The fill line is effectively drawn in the graphic display memory by the writing of data into corresponding memory locations. Thus, a line by line filling of the triangle occurs with new beginning and ending pixels locations being interpolated for each fill line.

While the Bresenham algorithm provides a reliable methodology for filling triangles, the fill polygon instruction, when directed against a wide variety of complex polygons, will encounter an ambiguity that cannot be handled by a conventional graphics co-processor. That is, polygons that present concave boundaries, possess self-intersecting boundaries, have self-overlapping sections or contain a fully enclosed "hole" have not been found to be accurately filled by simple decomposition to sets of triangles that are, in turn, filled. For example, a triangle sharing two vertices of the concave portion and any third vertex of a polygon is indeterminate as to whether it or any portion thereof should be filled.

A similar, additional ambiguity is encountered when considering a section of a complex polygon that is either self-overlapped or represents a "hole". That is, an ambiguity arises in determining whether to fill that portion of the polygon or not. This determination is further required in order to properly represent the overlap distinct from the remainder of the filled polygon. Often, it is desirable to represent an overlapped area of a polygon by a corresponding area of high-intensity brightness or a distinguishable color.

Consequently, many graphics co-processors either make no attempt to implement a complex polygon fill instruction or premise the utilization of the instruction on a non-complex polygon. In computer systems employing such graphics co-processors, the host is therefore required to manage the fill operation in close detail and ascertain by whatever faculties are at its disposal whether areas adjacent boundaries of the complex polygon are to be filled and, further, whether high intensity fill, representative of overlapping or double fill, is appropriate.

SUMMARY OF THE INVENTION

Thus, a purpose of the present invention is to provide a manner of accurately filling complex polygons that is autonomously implementable by a graphics co-processor.

This is accomplished in accordance with the present invention in a graphics co-processor that is responsive to an instruction directing the filling of a complex polygon as defined by an enumeration of P vertices. The co-processor preferably includes means for selecting a first vertex from the enumeration of its P vertices and for decomposing the complex polygon into a set of P-2 triangles, wherein each triangle includes the first vertex and two successive vertices as presented in the enumeration of P vertices. Also included is a means for deriving a sense value for each of the resultant P-2 triangles. Preferably, the apparatus further includes a means for filling the area bounded by each of the P-2 triangles with each triangle being filled with a predetermined fill quantity that is qualified by its respective sense value. Thus, the present invention provides for the autonomous execution of a polygon filled instruction.

Another advantage of the present invention is that it provides a methodology for filling complex polygons that can be readily implemented in a wide variety of graphics co-processors generally independent of the specific nature of the graphics engine utilized therein.

A further advantage of the present invention is that it requires essentially no host processor support in its execution of a polygon fill instruction.

Yet another advantage of the present invention is that it requires essentially no increase in the complexity of a graphics engine, otherwise present in a graphics co-processor, in order to perform a polygon fill instruction in accordance with the present invention.

A still further advantage of the present invention is that it provides for the fully unambiguous filling of complex polygons at fill rates comparable to or exceeding that of conventional graphics co-processors in filling the simplest of polygons.

BRIEF DESCRIPTION OF THE DRAWINGS

These and other advantages and further features of the present invention will become apparent and better understood when considered in conjunction with the following detailed description of the invention and the accompanying drawings, wherein like reference numerals designate like parts throughout the figures thereof and wherein.

DETAILED DESCRIPTION OF THE INVENTION

Figure 1:
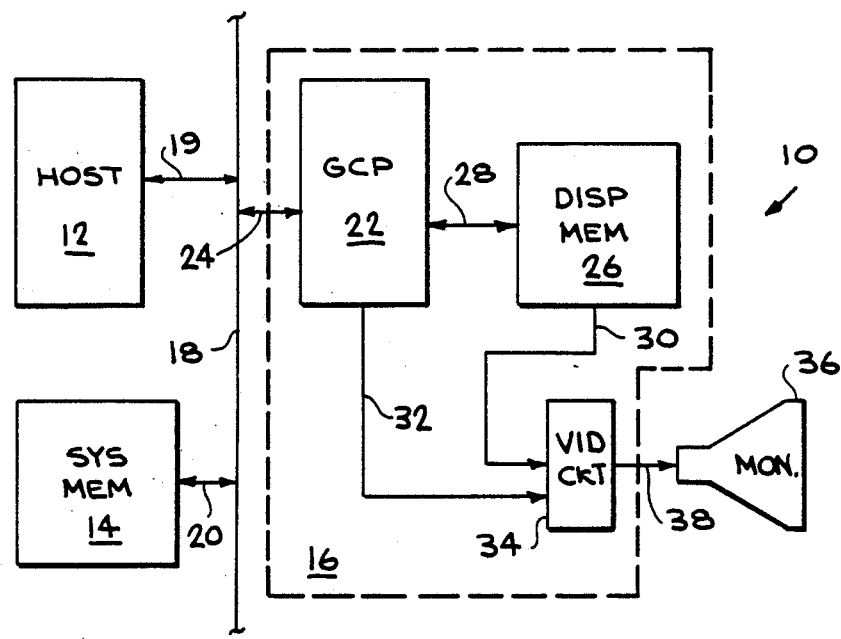
FIG. 1 is a simplified block diagram of a computer system employing a graphics display subsystem.

A computer system, generally indicated by the reference numeral 10, employing a graphics display subsystem 16, consistent with a preferred embodiment of the present invention, is shown in FIG. 1. The computer system 10, in addition to the graphics subsystem 16, preferably includes a host processor 12 and an associated host system memory 14. Preferably, the host 12, system memory 14 and graphics subsystem 16 are interconnected by a system bus 18 for the transfer of address, control and data information via the respective host, memory and graphics subsystem buses 19, 20, 24. Preferably, instructions and data are sourced to the graphics subsystem 16 either from the host 12 or directly from the system memory 14 via an appropriately established direct memory access (DMA) channel. Similarly, status results and data sourced by the graphics subsystem 16 are preferably transferred back to the host 12 or, again, directly stored back to the system memory 14 via a reverse DMA channel.

In accordance with the present invention, the graphics subsystem 16 preferably includes a graphics co-processor 22, a dedicated graphic display memory 26 and a video adapter circuit 34 including, for example, a color lookup table. The graphics co-processor 22 preferably performs a number of video support functions in addition to the specific execution of graphics instructions. In particular, the graphics co-processor preferably provides the video circuit 34 with control signals, such as horizontal and vertical timing clock signals, ad data for establishing, for example, a current color pallet. These control and data signals are preferably provided by the graphics co-processor 22 to the video circuit 34 via control and data lines 32.

The graphics co-processor 22 executes graphics instructions largely against the display memory 26. Preferably, the display memory 26 is a dedicated block of random access memory logically organized as four memory planes of 1,280 by 1024 memory locations each. These memory locations are accessible for reading and writing of data by the graphics co-processor 22 via the display memory control and data bus 28. Thus, the graphics co-processor 22 may read from, modify and write back data stored by the display memory 26 as necessary to effect the execution of a graphics instruction.

Additionally, the video circuit 34 receives data from the display memory 26. Thus, under the controlling guidance of the graphics co-processor 22, the video circuit 34 periodically provides a stream of data originating from the display memory 26 to a graphics display monitor 36, via a video data and control lines 38, for the updating of the image presented thereby.

Figure 2:
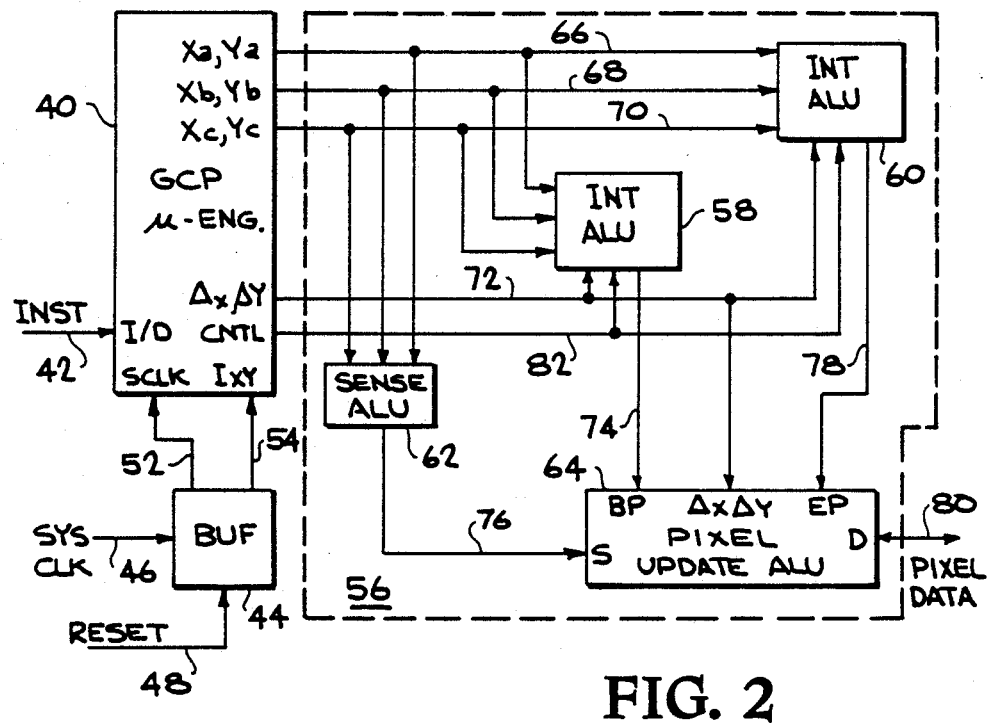
FIG. 2 is a block diagram of the graphics micro-engine and arithmetic logic unit block constructed in accordance with the present invention.

Considering now FIG. 2, a graphics co-processor micro-engine 40 and arithmetic logic unit block 56, provided in accordance with a preferred embodiment of the present invention, are shown. Preferably, the graphics co-processor micro-engine 40 is a micro-coded sequencer unit responsive to instructions and data as provided thereto via an instruction bus 42. The micro-engine 40 is preferably throughout also responsive to a timing signal (SCLK) provided by way of a buffer 44. A system clock signal (SYS CLK) and graphics subsystem reset control signal are preferably provided to the buffer 44 via respective clock and reset control lines 46, 48. In response, the buffer 44 provides the buffered system clock signal to the micro-engine 40 via SCLK line 52. An initialization control signal, produced in response to the reset control signal, is also provided to the micro-engine 40 via the Ixy control line 54.

Consistent with the present invention, the ALU block 56 and its interface to the micro-engine 40 can be realized in a variety of specific manners including a single ALU coupled to the micro-engine 40 by two general purpose ALU input buses and an ALU result bus back to the micro-engine 40. Alternately, an ALU block 56 that contains multiple, dedicated function ALUs interconnected substantially as shown in FIG. 2 may be utilized. However, in all cases, the preferred logical implementation of the micro-engine 40 and ALU block 56 is, in each case substantially as illustrated in FIG. 2.

Preferably, the ALU logic block 56 includes a beginning point interpolation ALU 58 and end point interpolation ALU 60, a sense ALU 62 and a pixel update ALU 64. The micro-engine 40 preferably provides, for purposes of filling a triangle, the corresponding set of triangle vertices coordinates via coordinates vertices buses 66, 68, 70 and a current xy drawing point location via XY bus 72 to the ALU block 56.

By convention, for purposes of the present invention, the beginning point for the drawing of each line required to fill a triangle lies on the line connecting the two vertices of the triangle having the least relative x coordinate magnitudes. Similarly, the ending point for each fill line is located along the line connecting the two vertices having the greatest relative x coordinate magnitude. Fill lines are drawn linearly in the x increasing coordinate direction at each incremental y coordinate value between the minimum and maximum relative Y coordinate magnitudes of the vertices. Finally, fill line drawing begins at the largest relative y coordinate magnitude and proceeds to the least.

Thus, consider the filling of a triangle having the coordinates ($x_a y_a$, $x_b y_b$, $x_c y_c$) where, for example, $$x_c > x_b > x_a \qquad \text{Eq. 1}$$

$$y_b > y_c > y_a \qquad \text{Eq. 2}$$

Accordingly, the beginning point interpolation ALU 58 will interpolate along the line $x_b y_b$, $x_a y_a$ while the ending point interpolation ALU 60 will interpolate along the line $x_b y_b$, $x_c y_c$. The respective selection of the proper pairs of triangle vertices by the beginning point and ending point interpolation ALUs 58, 60 is in response to a configuration control signal provided by the micro-engine 40 via a control line 82. Preferably, this configuration control signal is simply the stored result of prior, micro-engine controlled ALU block operations to determine the relative magnitudes of the vertices coordinates and apply the conventions of the present invention.

The sense ALU 62 is also preferably provided with the coordinates of each of the vertices via lines 66, 68, 70. In accordance with the present invention, the sense ALU 62 determines a sense value to be associated with the triangle currently being filled. The sense ALU 62 therefore preferably determines the closed circuit direction of the triangle as determined from the relative order of its vertices and the relative magnitudes of their coordinates. That is, by convention for purposes of the present invention, the triangle defined by Equations 1 and 2 above has a positive sense value while a triangle defined by, for example, $$x_b > x_c > x_a \qquad \text{Eq. 3}$$

$$y_c > y_b > y_a \qquad \text{Eq. 4}$$

has a negative sense value, both for the given vertices order A, B, C. Changing the vertices order to A, C, B results the reversal of the sense values for both triangles. Preferably the sense value determined by the sense ALU 62 is provided to a pixel update ALU 64 via a sense value line 76. In accordance with the present invention, this sense value will remain the same throughout the filling of the triangle.

The pixel update ALU 64 preferably functions to draw each fill line. Accordingly, the pixel update ALU 64 preferably receives beginning and ending point x coordinates from the beginning and ending point interpolation ALUs 58, 60, via the beginning and ending point value lines 74, 78. The sense value of the current triangle being filled is provided to the pixel update ALU 64 via sense line 76. The pixel update ALU 64 also receives a control signal indicating, at least, respective increments in the drawing point location as they occur in both the x and y coordinate directions. Finally, the pixel update ALU 64 further receives the pixel data from the display memory 26 and, specifically, the memory location corresponding to the current pixel drawing location. This data is transferred via the pixel data bus 80. In operation, the ALU block 56, in combination with the micro-engine 40, incrementally accesses memory locations of the display memory 26 corresponding to the respectively current x and y values maintained by or provided to the pixel update ALU 64. Ultimately, each increment of the x and y values is directly in response to the micro-code procedures executed by the micro-engine as invoked in response to the receipt of a corresponding graphics instruction. Preferably, when the current x location value is incremented equal to or greater than the beginning point value as provided by the beginning point interpolation ALU 58, the pixel update ALU 64 selectively modifies and writes back data at each pixel memory location accessed. The modification of the data is preferably based on the triangle sense value as determined by the sense ALU 62. In a preferred embodiment of the present invention, the sense ALU 62 provides one of two complementary sense values for any triangle being filled In response, the pixel update ALU either adds or subtracts a fill data quantity from the pixel data value as initially accessed. The result is then written back to its pixel memory location. The process of current x coordinate location incrementing and modification of its corresponding pixel data preferably continues until the incremented x coordinate location exceeds the ending point value as provided by the ending point interpolation ALU 60. Thereafter, the pixel data is no longer modified for any x coordinate location for the current y coordinate location. Thus, a single fill line has been effectively drawn.

Subsequently the current y coordinate location is decremented and the current x coordinate location set to the beginning point x coordinate location for the now current y coordinate location. That is, following the completion of the drawing of a fill line, the micro-engine 40 preferably provides at least a decrement y signal to the ALUs 58, 60, 64 via the control line 84. In response, the beginning point interpolation ALU 58 generates and provides a new beginning point value obtained from the slope defined by its respective two vertices and cumulative incremental change in the y coordinate value. Thus, a new beginning point x coordinate value is immediately calculable by the beginning point interpolation ALU 58 with each decrement of the y coordinate value.

Similarly, the ending point interpolation ALU 60 preferably derives a new ending point x coordinate value based on the slope defined by its respective two vertices and the cumulative incremental change in the y coordinate value.

Therefore, since at least the beginning point value is available prior to or at the beginning of drawing of a new fill line, the pixel update ALU 64 preferably utilizes the beginning point value to select a corresponding pixel memory location as the first such location to be accessed in drawing the now current fill line.

Figure 3:
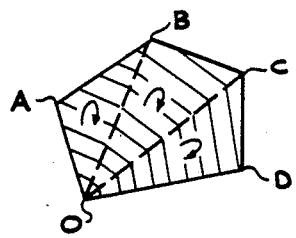
FIG. 3 is a simple polygon for illustrating the basic operation of the present invention.

In order to better understand the preferred operation of the present invention, reference is now made to FIG. 3. In accordance with the present invention, the filling of the regular polygons shown in FIG. 3 proceeds from the receipt of a corresponding fill polygon instruction and enumerated list OABCD of the polygon vertices coordinates. A first or reference vertex, such as O, is selected from the enumerated list of vertex coordinates. The regular polygon of FIG. 3 can then be decomposed into triangles. In accordance with the present invention, each such triangle is selected as having the reference vertex and two successive vertices as ordered in the enumerated list of vertices coordinates. The decomposition set of triangles is therefore generally constrained in number to P-2, where P is the number of polygon vertices. Thus, the regular polygon of FIG. 3 will decompose to the three triangles OAB, OBC, OCD. Although the entire regular polygon of FIG. 3 can be decomposed consistent with the present invention at this time, preferably each triangle is sequentially operated on until it is filled, whereupon the polygon is decomposed to provide a next triangle.

Once a triangle is obtained by decomposition, the sense value associated with the triangle is determined. In accordance with the present invention, the ordered sequence of the triangle vertices is the reference vertex followed by the remaining two vertices in the order that they appear in the original enumerated list of vertices coordinates. Thus, by convention for the purposes of the present invention, the illustrated clockwise ordering of the vertices of the triangle OAB is defined as being of a positive sense value. Conversely, in accordance with the present invention, a vertex ordering of OBA would yield a counterclockwise and therefore negative sense value. Consequently, the filling of the first triangle is with a positive sense value for the entire area bounded by the triangle OAB. Thus, as each pixel memory location within the triangle OAB is accessed, a positive fill value is added to the pixel data accessed before being stored back to the memory array 26.

In accordance with the conventions of the present invention, fill line drawing is initiated at vertex B with the beginning and ending points of each fill line lying along the respective lines BA and BC. However in order to complete the filling of the triangle OAB, the beginning point interpolation ALU 58 determines a new beginning point line slope, namely the slope of line AC, after the fill line beginning at vertex A is drawn. The drawing of fill lines then continues until the beginning and ending points coverage at vertex C.

Triangles OBC and OCD are similarly obtained by decomposition of the polygon of FIG. 3 and then filled by the addition of a common sense value qualified fill value at each pixel memory location However, in accordance with a preferred embodiment of the present invention, the pixels corresponding to the shared triangle boundary lines OB and OC are not effectively filled twice. Rather, where boundary pixels are shared by two adjacent triangles and where the triangles have the same sense value, those shared pixels are filled only once in the filling of the two triangles. Alternately, where boundary pixels are not shared by adjacent triangles, such as may occur with an overlapping triangle, or where the fill sense values of adjacent triangles are different, the shared boundary pixels are filled as part of each triangle. Consequently, the present invention properly treats pixels belonging to multiple distinct decomposition triangles, yet included only once in the complex polygon OABCD.

A complex polygon OABCD, characterized by a concavity at ABC, is shown in FIG. 4. The reference vertex is chosen arbitrarily as vertex O. In accordance with the present invention, polygon decomposition yields a first triangle OAB having a positive sense value. For purposes of example, the initial pixel data value at each memory location within the polygon OABCD is assumed to be zero and that a fill quantity of one is to be used in conjunction with the filling the complex polygon OABCD. Thus, as shown in FIG. 4b, the triangle OAB is filled at each pixel memory location with the uniform value of one.

Figure 4A:
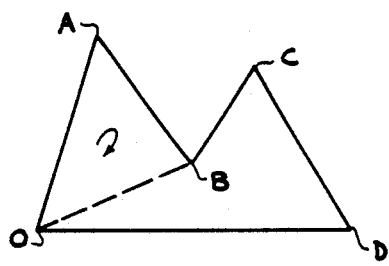
FIGS. 4a–d are sequential illustrations of the operation of the present invention in filling a first complex polygon in accordance with a preferred embodiment of the present invention.
Figure 4B:
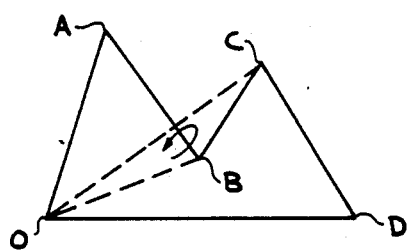
Figure 4C:
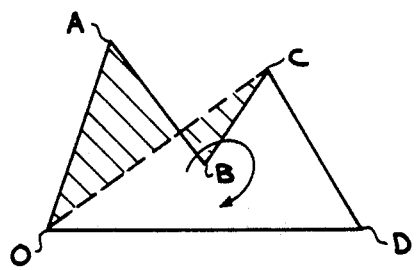

A second decomposition triangle occurs as OBC, as shown in FIG. 4b. In accordance with the present invention a negative sense value is determined for the triangle OBC. Thus, the filling of the triangle OBC is with a negative sense value fill quantity The data dependent modification of pixel data results in the pixel data at memory locations common to both the polygon OABCD and the decomposition triangle OBC being returned to a zero value while the remaining portion of the decomposition triangle OBC is provided with pixel data values of negative one. Specifically in accordance with the treatment of triangle fill boundaries described above, the OC boundary pixels between the vertex O and the boundary AB are filled to a current value of zero. The remaining pixels of the boundary OC are filled to negative one. The result of the filling of triangle OBC is, therefore, as shown in FIG. 4c.

Figure 4D:
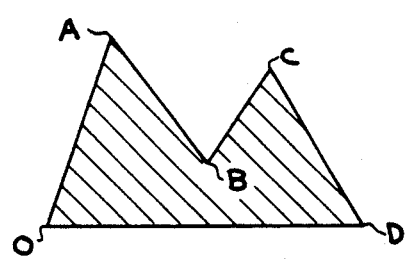

A third and final decomposition triangle OCD is next obtained. As apparent from FIG. 4c the decomposition triangle OCD has a positive sense value and, significantly, includes exactly that portion of the previous decomposition triangle OBC that was filled with a negative one pixel value. Thus, in the filling of the decomposition triangle OCD, the remainder of the complex polygon OABCD is filled with a positive fill quantity of one while the negatively filled portion of polygon OBC is modified to zero. Consequently, the filled complex polygon OABCD is obtained as shown in FIG. 4d. Significantly, the present invention has provided for the unambiguous and proper handling of the concavity defined by the lines ABC.

The filling of a significantly more complex polygon, in accordance with the present invention, is illustrated in FIG. 5. Again, the reference vertex is arbitrarily chosen as vertex O. The enumerated list of vertices for the complex polygon of FIG. 5 is given as OABCDE. The polygon of FIG. 5, as defined by its enumerated list, has a self-intersection of the polygon lines BC and DE. An internal triangle iCD is also thereby formed. In accordance with the present invention the determination of whether this internal triangle is to be left unfilled, filled or multiply filled is explicitly determined and performed by the present invention.

Figure 5A:
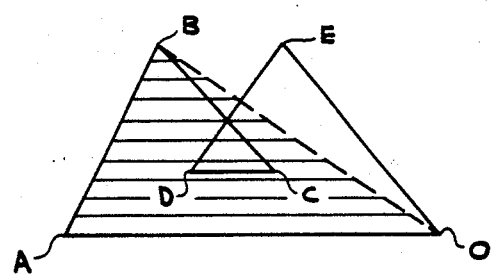
FIGS. 5a–d are sequential illustrations of the operation of the present invention in filling a second complex polygon in accordance with a preferred embodiment of the present invention.

The first decomposition triangle OAB, having a positive sense value, is shown as filled in FIG. 5a. This results in a first filling of the internal triangle iCD.

Figure 5B:
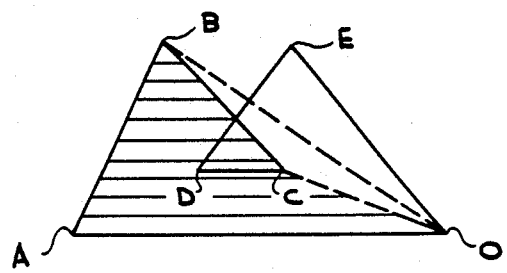

The second decomposition triangle OBC, having a negative sense value, is shown in FIG. 5b. Due to its negative sense value and the prior filling of its corresponding area in conjunction with the filling of triangle OAB, the area bounded by OBC, including the shared boundary line OB, is effectively filled back to a common pixel data value of zero.

Figure 5C:
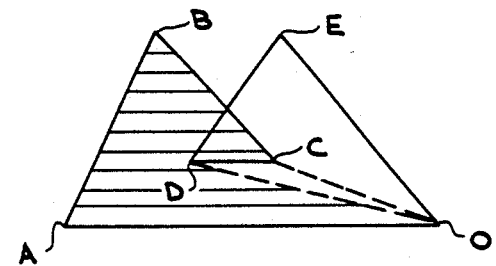

The third decomposition triangle OCD, also having a negative sense value, is shown in FIG. 5c. Since the area bounded by triangle OCD was also prior filled in conjunction with the filling of triangle OAB, the area bounded by triangle OCD is effectively filled back to a common pixel data value of zero. The boundary OD is filled to zero, in accordance with the boundary treatment of the present invention. However, the boundary OC, as shared with the triangle OBC, is not further filled to a negative one. Thus, it effectively remains at its pixel data value of zero.

Figure 5D:
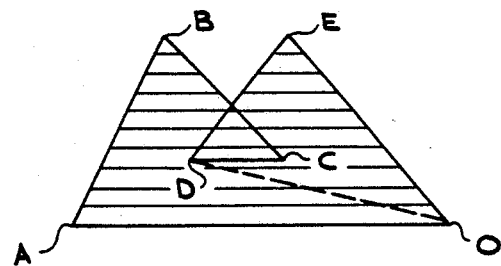

Finally, the last decomposition triangle ODE, having a positive sense value, is shown in FIG. 5d. With the exception of the internal triangle iCD, the filling of triangle ODE, including the boundary OD, results in a common final pixel data value of positive one. However, the internal triangle iCD, initially having a positive one fill value for the area bounded thereby, is filled to a positive two fill value in accordance with the present invention. Consequently, the filling of the complex polygon of FIG. 5 illustrates the present invention's ability to accurately and autonomously handle the filling of a complex polygon having convexities, self-intersections, and area overlaps.

Figure 6:
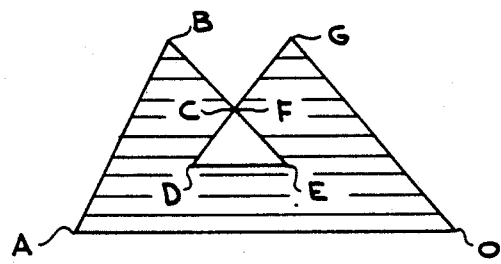
FIG. 6 is an illustration of a third complex polygon as filled in accordance with a preferred embodiment of the present invention.

To further illustrate the ability of the present invention to properly handle complex polygons including a "hole", a complex polygon closely related to that shown in FIG. 5 is shown in FIG. 6. The enumerated list of vertices for the complex polygon of FIG. 6 is given as OABCDEFG with vertex O being chosen as the reference vertex. In the practice of the present invention, the area bounded by the triangle CDE(F) will be included within the area bounded by the decomposition triangles OAB and OCD, respectively having positive and negative sense values. Consequently, the internal triangle CDE(F) will be left with its initial fill value unaltered by the filling of the complex polygon OABCDEFG.

Thus, an apparatus and specific methodology for the fully autonomous filling of complex polygons, having such complexities as concavities, self-intersections, overlapping sections and "holes", have been described.

Naturally, many modifications and variations in the implementation and procedures of the present invention are possible in light of the above teachings. For example, the present invention is not restricted to only complex polygons having linear boundaries. Rather, the enumerated list of vertices could include an arc factor that is descriptive of the degree of arc and relative displacement of the line interconnecting two vertices of the polygon. All of the advantages and features of the present invention are obtained by accommodating the arc factor in the interpolation of new beginning and ending fill line corresponding pixel memory locations. Further, the present invention is not closely restricted to any particular degree of implementation in hardware, firmware (including micro-code) or software. Rather, the advantages and features of the present invention may be realized to varying degrees by its varied possible embodiments. It is therefore to be understood that, within the scope of the appended claims, the present specifically described herein.

I claim:

1. Computer graphics apparatus for filling a complex polygon, as defined by an enumeration of P vertices, with a fill quantity, said apparatus comprising:
   (a) means for selecting a first vertex from said enumeration of P vertices and for decomposing said complex polygon into an set of P-2 triangles, each said triangle representable as a respective enumeration of T vertices including said first vertex and two successive vertices in said enumeration of P vertices;
   (b) means, receiving each said respective enumeration of T vertices, for deriving a sense value for each said triangle, said deriving means determining each said sense value based on the enumerated order of the T vertices in a plane defined thereby, a first sense value corresponding to a clockwise enumeration order and a second sense value corresponding to a counterclockwise enumeration order; and
   (c) means, responsive to said deriving means, for successively filling the area bounded by each said triangle with a fill quantity qualified by said first or second sense value.

2. The apparatus of claim 1 wherein said P vertices are defined by respective sets of x- and y-coordinate values and wherein said deriving means derives either said first or said second sense value for each said enumeration of T vertices based on the vertices enumeration order and the relative magnitudes of the set of x- and y-coordinate values in each said enumeration of T vertices.

3. The apparatus of claim 2 wherein said filling means includes means for summing respective sense value qualified fill quantities in areas mutually bounded by overlapping portions of said triangles.

4. The apparatus of claim 3 wherein said filling means incrementally fills each said triangle, said filling means including first and second means for determining incremental boundary positions of each said triangle, said filling means being responsive to said first and second determining means for beginning and ending an incremental filling of a corresponding one of said triangles.

5. The apparatus of claim 4 wherein each said triangle is incrementally filled by said filling means in respective succession.

6. The apparatus of claim 5 wherein said sense value deriving means determines a sense value of plus or minus one for each of said triangles, wherein said summing means supports addition with negative fill quantity results and wherein said filling means supports filling said triangles with a negative sense value fill quantity.

7. The apparatus of claim 6 wherein said filling means fills each said triangle in order corresponding to the successive enumeration of said enumeration of P vertices.

8. The apparatus of claim 7 wherein said filling means selectively fills the shared boundary of any two said triangles, adjacent as sharing a uniquely enumerated vertex and said first vertex therebetween, the shared boundary being filled with the filling of the two adjacent said triangles depending on the respective sense values of the two adjacent said triangles.

9. The apparatus of claim 8 wherein said filling means selectively does not twice fill the shared boundary between two adjacent said triangles with the respective filling of the two adjacent said triangles whenever the respective sense values of the two adjacent said triangles are the same.

10. The apparatus of claim 9 further comprising:
    (a) computation means for performing arithmetic and logical operations; and
    (a) sequencer means for performing control functions including the control of said computation means to implement said selecting means, said deriving means and said filling means.

11. The apparatus of claim 10 wherein said enumeration of P vertices includes a curvilinear factor for a pairs of said vertices, such that said triangles includes at least one said triangle having a curvilinear boundary, and wherein said first and second incremental boundary determining means of said filling means are respectively responsive to curvilinear factors assembled with respective pairs of said vertices.

12. A computer method of performing a polygon area fill operation for a polygon described as an enumerated list of vertex coordinates, said method comprising the steps of:
- (a) selecting a reference vertex of said polygon;
- (b) decomposing said polygon into a plurality of triangles, each said triangle including said reference vertex and two other vertices;
- (c) determining the sense of each said triangle from the enumeration order of said reference vertex and said two other vertices about an axis perpendicular to a plane defined by said reference vertex and said two other vertices;
- (d) filling the area bounded by each said triangle with a value having a weighting based on the respective sense of each said triangle; and
- (e) combining the values corresponding to respective portions of each of said triangles as may bound a respectively common portion of said triangles.

13. The method of claim 12 wherein said step of decomposing includes the step of selecting two vertices that are adjacent one another in said enumerated list as the two other vertices of each respective said triangle.

14. The method of claim 13 further comprising the step of assigning the resulting combined value to the respective common portions of each said triangle.

15. The method of claim 14 wherein said step of determining the sense of each said triangle includes the steps of:
- (a) determining the relative clockwise or counter clockwise order of the vertices defining each said triangle; and
- (b) assigning a positive or negative sense to each said triangle based on its respective clockwise or counter-clockwise order of vertices.

16. The method of claim 15 wherein said step of combining provides for the summing of the respective values to be combined.

17. The method of claim 16 wherein said step of filling includes the step of filling a boundary portion of each said triangle where each said boundary portion is shared by respectively adjacent said triangles that share a uniquely enumerated vertex and said reference vertex, each said boundary portion of adjacent said triangles having the same sense being filled only once with the filling of the respective adjacent said triangles.

18. A processor, responsive to an instruction to fill a polygon definable by data stored within a memory array at corresponding memory locations, said instruction providing an enumerated list of data specifying the respective vertices of said polygon, said processor being associated with said memory array for the selective accessing of memory locations and storage of data with respect thereto, said processor comprising:
- (a) ALU (arithmetic logic unit) means for performing data computations; and
- (b) sequencer means, coupled to said ALU means, for controlling said ALU means, said sequencer means providing data to said ALU means and receiving status and data from said ALU, said sequencer means including:
  - (i) means for selecting three vertices of said polygon;
  - (ii) means for determining a sense value based on the relative order of said three vertices in the enumerated list and the respective data specifying said three vertices, said sense value having a polarity corresponding to the relative direction about an axis perpendicular to a plane defined by said three vertices; and
  - (iii) means, responsive to said determining means, for filling the area defined by said three vertices with a predetermined data value qualified by said sense value.

19. The processor of claim 18 wherein said selecting means initially selects a reference vertex from said enumerated list and wherein said three vertices selected include said reference vertex and two other vertices successively enumerated in said enumerated list.

20. The processor of claim 19 wherein said filling means includes means for accessing the memory locations corresponding to the area defined by said three vertices, for adding said predetermined data value, as qualified by said sense value, to the data stored at each memory location accessed and for storing the resultant data back to its respective memory location.

21. The processor of claim 20 wherein said adding means of said filling means includes means for determining whether an accessed memory location is shared at a boundary between areas defined by respective sets of said three vertices and whether the respective sets of said three vertices have identical respective said sense values, said adding means adding said predetermined data value, qualified by said sense, to the data stored at each such shared memory location in the filling of the areas defined by both sets of said three vertices.

22. A graphics co-processor, responsive to a host processor for the receipt of instructions and related data and coupled to a graphics display memory array for the accessing and storage of pixel data at respective pixel corresponding memory locations, said co-processor comprising:
- (a) a graphics engine including a micro-coded sequencer responsive to a fill polygon instruction and associated polygon defining enumerated list of respectively unique vertices and curvilinear boundary definition factors; and
- (b) an arithmetic logic unit, responsive to said sequencer, for receiving data from said graphics engine and said graphics display memory array, for performing computations on the data provided thereto, said arithmetic logic unit providing resultant data to said graphics engine and said graphics display memory array and computation status information to said graphics engine, said sequencer implementing procedures, including procedures utilizing said arithmetic logic unit, for:
  - (i) selecting a reference vertex of said polygon;
  - (ii) selecting a set of three vertices of said polygon including said reference vertex and two vertices adjacently enumerated in said enumerated list of vertices;
  - (iii) first determining a +1 or −1 closed circuit sense value for said set of three vertices based on the relative direction of rotation defined by the enumeration order of said set of three vertices in a plane defined by said set of three vertices;
  - (iv) second determining whether a sense value qualified fill data value should be added to the pixel data stored at each pixel corresponding memory location shared at a boundary of any two areas as defined by respective said sets of three vertices and their associated curvilinear boundary definition factors where said sets of three vertices share a uniquely enumerated vertex other than said reference vertex; and
  - (v) adding a sense value qualified fill data value to the pixel data stored at each pixel corresponding memory location within said graphics memory array and within and at the boarders of an area defined by said set of three vertices and their associated curvilinear boundary definition factors.

23. The co-processor of claim 22 wherein said second determining procedure implemented by said sequencer determines to add said sense value qualified fill data value at each boundary pixel corresponding memory location only for one of said sets of three vertices and their associated curvilinear boundary definition factors if both are determined to have the same sense value.

24. The co-processor of claim 23 wherein said procedures implemented by said sequencer includes a procedure implementing a curvilinear boundary definition factor sensitive interpolation selection of pixel corresponding memory locations corresponding to beginning and ending point curvilinear lines between paired vertices of said set of three vertices and their associated curvilinear boundary definition factors and an associated procedure implementing the sequential accessing of pixel corresponding memory locations located linearly between corresponding beginning and ending point curvilinear line pixels.

* * * * *